US008882023B2

(12) United States Patent
Brown

(10) Patent No.: US 8,882,023 B2
(45) Date of Patent: Nov. 11, 2014

(54) AIRCRAFT STRUCTURAL ASSEMBLY WITH ELECTROMAGNETIC PROTECTION

(75) Inventor: Arlene McKeeman Brown, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 451 days.

(21) Appl. No.: 13/083,652

(22) Filed: Apr. 11, 2011

(65) Prior Publication Data

US 2012/0258323 A1    Oct. 11, 2012

(51) Int. Cl.
*B64D 45/02*    (2006.01)

(52) U.S. Cl.
CPC ....................................... *B64D 45/02* (2013.01)
USPC ........................................... 244/1 A; 244/133

(58) Field of Classification Search
CPC ........... B64D 45/02; B32B 3/12; B32B 15/14
USPC ................. 244/1 A, 129.1, 133, 119
See application file for complete search history.

(56) References Cited

U.S. PATENT DOCUMENTS

| | | | |
|---|---|---|---|
| 4,448,838 | A | 5/1984 | McClenahan et al. |
| 5,225,265 | A | 7/1993 | Prandy et al. |
| 5,370,921 | A | 12/1994 | Cedarleaf |
| 5,417,385 | A | 5/1995 | Arnold et al. |
| 6,086,975 | A | 7/2000 | Brick et al. |
| 6,303,206 | B1 | 10/2001 | Brick et al. |
| 6,432,507 | B1 | 8/2002 | Brick et al. |
| 2009/0092844 | A1 | 4/2009 | Ware et al. |
| 2009/0258220 | A1 | 10/2009 | Schaaf et al. |
| 2010/0086729 | A1* | 4/2010 | Long ............................ 428/116 |
| 2010/0147546 | A1 | 6/2010 | Mull et al. |
| 2011/0318981 | A1 | 12/2011 | Duval et al. |

FOREIGN PATENT DOCUMENTS

FR    2939954    6/2010

OTHER PUBLICATIONS

European Search Report, European Application No. 12163808.4 (May 7, 2013).
"Fundamentals of carbon fiber technology and their appliation to "Torayca" products, Chapter 7. Functional and Compressive Properties," by Toray Industries, Inc., http://www.torayca.com/techref/en/techreftop.html (2005).
Antonsen, R. et al., "Polarization Behavior of Carbon Fiber as an Anodic Material in Cathodic Protection" (date of first publication unknown).
Larsen, D.C., "Thermal Conductivity of Boron/Epoxy, Graphite/Epoxy, Boron/Aluminum, and Borsic/Titanium Advanced Composite Materials," American Ceramic Society Meeting 76th, 1984, Chicago, Illinois, Presented at the annual meeting held Apr. 28-May 2, 1984.
Gajda, W.J., *Measurement of the Electrical Properties of Composite Materials in the Frequency Range of DC to 30 MHz* (1979).

(Continued)

*Primary Examiner* — Rob Swiatek
*Assistant Examiner* — Timothy Schwarz
(74) *Attorney, Agent, or Firm* — Robert B. Parker

(57) ABSTRACT

Disclosed in this application is a novel method and apparatus for reducing electrical resistance of a carbon-reinforced plastic structure to thereby reduce damage due to lightning strikes or precipitation static. This apparatus includes a galvanically compatible conductive interface layer positioned between a nonconductive substrate and a conductive outer surface. The interface layer is electrically conductive to transmit electrical current from the outer surface to the substrate.

20 Claims, 8 Drawing Sheets

(56) References Cited

OTHER PUBLICATIONS

Kim, D.G. et al., "Measurement of Advanced Composite Materials Shielding Effectiveness" (1974).
*Soviet Advanced Composites Technology Series. Fibre Science and Technology*, edited by V.I. Kostikov, Chapman & Hall, p. 407 (1995).
D6-44735-2 AFFDL TR 77-127 v2, Vulnerability/survivability of composite structures-lightning strike (design guidelines), AFFDL-TR-77-127 vol. II final report, Jun. 1975-Oct. 1977, Hendricks, Carl L.; Schneider, Standford and Olsen, Glenn, Boeing Limited, 1978. Confidential Information—Available to DoD from DTIC services via form 55.

* cited by examiner

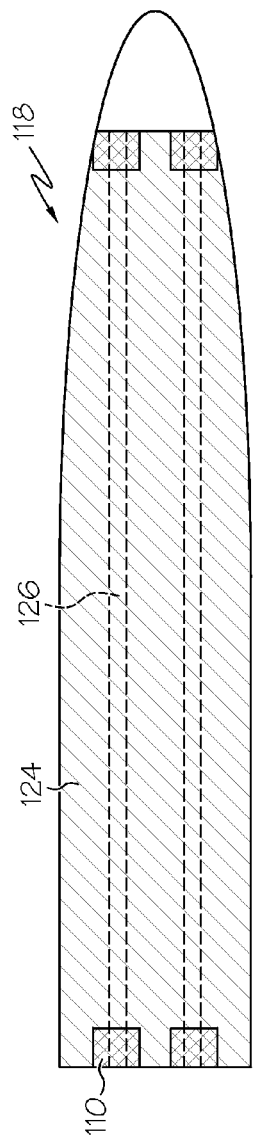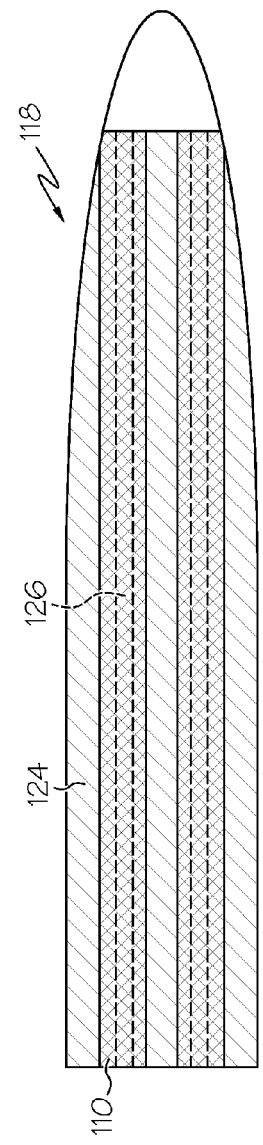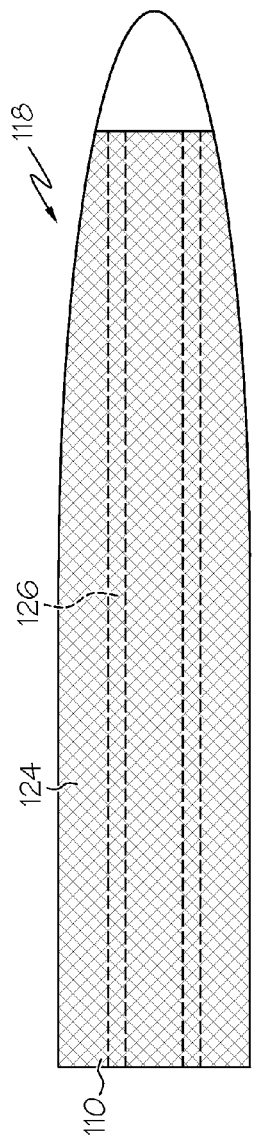

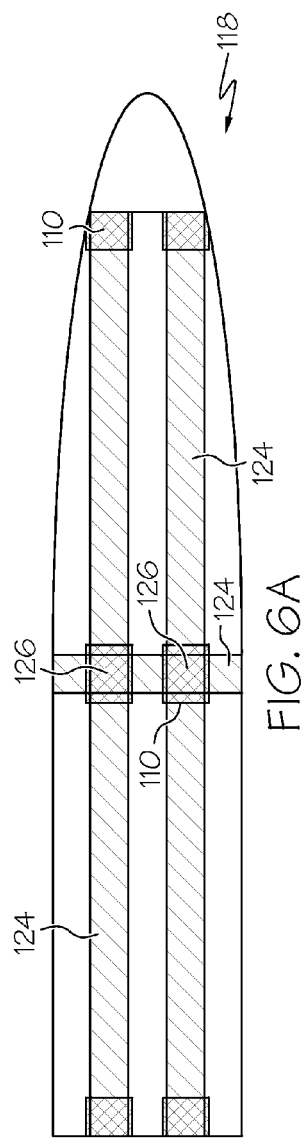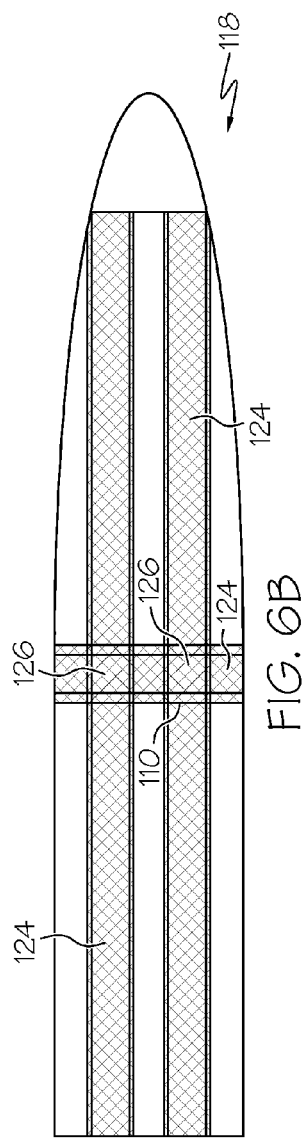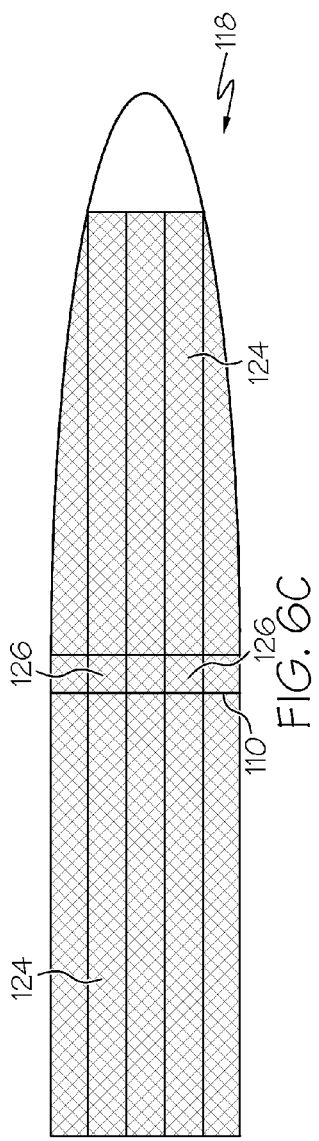

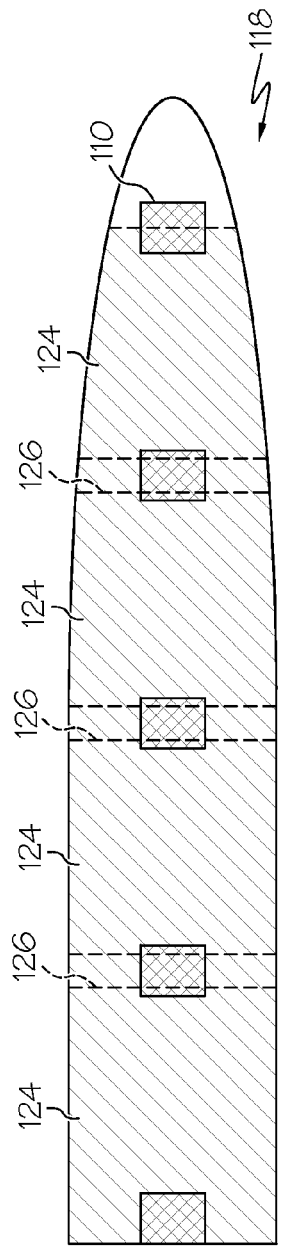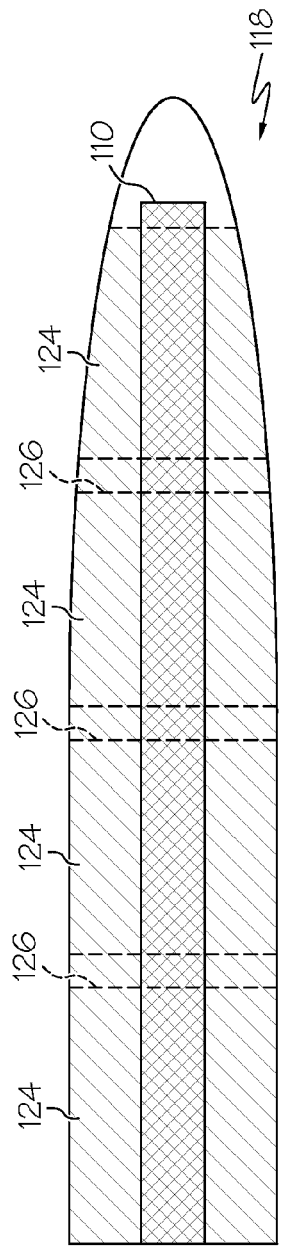

AIRCRAFT STRUCTURAL ASSEMBLY WITH ELECTROMAGNETIC PROTECTION

BACKGROUND

The present disclosure is directed to aircraft structural assemblies of manned or unmanned airborne vehicles, and more particularly to aircraft structural assemblies for providing precipitation static and lightning strike protection.

The principal material used in the construction of aircraft for much of the past half-century has been aluminum. Aluminum, an excellent conductor, is a highly electrically conductive material and therefore is ideal for dissipating electrical energy across the surface of the aircraft. This conductivity is particularly useful in case of lightning strikes where a large amount of current is transferred to the aircraft over a short period of time.

Electrical energy may also build up on the aircraft due to precipitation static ("P-Static") resulting from friction between the aircraft and airborne particles, particularly snow, rain, dust, or ice. In these cases, it is important to transmit the electrical energy to static dischargers to reduce interference with instruments and communications in the aircraft.

Aircraft that have an exterior skin that is formed substantially of aluminum have few problems dissipating energy from P-Static and for locations where it is especially high, use static dischargers to control static build-up. The low electrical resistance of aluminum makes distribution of electrical energy a low concern. However, the higher electrical resistance of carbon fiber, or the much higher electrical resistance of dielectric fibers such as glass or aramid, makes interference due to P-Static more likely. Both of the above-described solutions also help mitigate this problem.

One method to increase the conductivity of the composite outer skin of an aircraft is to use expanded foil, such as copper, that is placed adjacent to the carbon reinforced substrate to decrease the chance of damage from lightning strikes. This method requires that expanded foil be galvanically compatible with the carbon substrate, or a dielectric substrate (such as a glass epoxy) must be placed between the foil and carbon substrate to provide protection. The latter structure requires additional components electrically coupling the foil to an electrical ground. Splices or seams in the foil have increased resistance which may disrupt the relaxation of charge leading to precipitation static build-up and more localized lightning damage.

With this copper foil solution, which is moderate to highly galvanically compatible with the carbon substrate, the copper tends to corrode especially in the presence of microcracks that propagate from the copper into the substrate as well as up through the paint where they become visible cracks. These visible cracks can then make it easier for the green corrosion products to discolor the paint. The corrosion and microcracking increase maintenance costs and degrade performance. The use of a dielectric adhesive or surfacer to reduce this issue, increases the weight of the aircraft, reducing the effectiveness obtained by utilizing lighter carbon-fiber substrate. This solution is described extensively in, e.g., U.S. Pat. No. 5,417,385 to Arnold et al., the contents of which are hereby incorporated in their entirety.

As material science has advanced, stronger and more lightweight materials have been developed, such as carbon-reinforced plastic and other carbon fiber materials. Use of these materials, either selectively or throughout the aircraft, increases the load capacity of aircraft by reducing structural weight and increasing strength of the materials. However, the low conductivity of carbon reinforced plastic makes it particularly susceptible to damage due to lightning strikes especially when it is painted. In order to reduce the chance of damage due to lightning strikes, several solutions are used to increase conductivity of the carbon reinforced plastic substrate of the aircraft.

Another method of increasing conductivity of the outer skin of the aircraft is the use of P-Static finish consisting of a specialty primer or paint. The P-Static finish provides electrical conductivity to dissipate the precipitation static. However, this finish is highly volatile, not environmentally friendly, and requires restrictive processing, making commercial application time sensitive and difficult. The protection degrades with time. The black color of the most commonly used exterior P-static paint also presents aesthetic issues. While this solution prevents the buildup of precipitation static, it typically does not provide sufficient conductivity to mitigate lightning strikes.

Therefore, there is a need in the art for an improved method and apparatus for reducing damage from lightning strikes and reducing the effects of P-Static on aircraft.

SUMMARY

According to one embodiment, the invention describes an method of constructing an aircraft structural assembly that includes providing a substrate of carbon reinforced plastic, applying an interface layer attached to the substrate, and applying a layer of expanded aluminum foil over the substrate. The interface layer is selected so as to be electrically conductive and galvanically compatible with both the expanded aluminum foil and the carbon reinforced plastic substrate.

According to an alternative embodiment, the invention describes a structural assembly that has a nonmetallic substrate, an outer layer of higher electrical conductivity (relative to the nonmetallic substrate) that is galvanically incompatible with the nonmetallic substrate, and an interface layer positioned between the substrate and outer layer that is galvanically compatible with both and provides electrical conductivity between the outer layer and substrate.

According to yet another embodiment, the invention describes a method of increasing the electrical conductivity of an aircraft with a substrate having low electrical conductivity. First, a resin tape is applied to the substrate. Next, an expanded aluminum foil is applied over the substrate, where the aluminum foil has a higher electrical conductivity than the substrate. Finally, a filler is applied over the aluminum foil, thereby creating an aerodynamic surface.

BRIEF DESCRIPTION OF THE DRAWINGS

FIG. 5A is an aircraft wing illustrating one embodiment.
FIG. 5B is an aircraft wing illustrating an alternative embodiment.
FIG. 5C is an aircraft wing illustrating an alternative embodiment.
FIG. 6A is an aircraft wing illustrating an alternative embodiment.
FIG. 6B is an aircraft wing illustrating an alternative embodiment.

FIG. 6C is an aircraft wing illustrating an alternative embodiment.

FIG. 7A is an aircraft wing illustrating an alternative embodiment.

FIG. 7B is an aircraft wing illustrating an alternative embodiment.

DETAILED DESCRIPTION

As used herein, the term "galvanizing" refers to a process wherein two materials are placed adjacent one another such that electron transfer occurs between one material (the anode) and the other (the cathode) by means of an electrolyte, resulting in corrosion of one of the materials.

The term "galvanic compatibility" as used herein refers to the relative propensity of two materials to corrode when placed adjacent to one another. Materials are assigned a numerical value where lower numbers correspond to a highly cathodic material and higher numbers correspond to a highly anodic material. Galvanic compatibility refers to the difference between these values. This term may be quantified as "low", "moderate", or "high" galvanic compatibility.

Materials that are galvanically incompatible have a difference greater than 0.50V. These materials are likely to corrode even with precise temperature and humidity controls.

Low galvanic compatibility refers to materials wherein the quantitative difference between two materials is no more than 0.50V. These materials are unlikely to corrode in a precise temperature and humidity controlled environment, such as a laboratory.

Moderate galvanic compatibility refers to materials wherein the quantitative difference between two materials is no more than 0.25V. These materials are unlikely to corrode in an environment where temperature and humidity are controlled, but not precise, such as a warehouse.

High galvanic compatibility refers to materials wherein the quantitative difference between two materials is no more than 0.15V. These materials are unlikely to corrode even in areas with high concentrations of electrolytes, such as a standard environment. Materials that are highly galvanic compatible may also be referred to herein as "galvanically compatible".

The term "conductor" as used herein refers a material with volume resistivity of least $10^6$ ohm.-meter and surface resistivity of less than $10^6$ ohm/square.

The term "static dissipative" as used herein refers to a materials with volume resistivity between $10^6$ to $10^9$ ohm-meter and surface resistivity less than $10^{11}$ ohm/square.

The term "dielectric" refers to an electrically insulative material with volume resistivity greater than $10^9$ ohm-meter and surface resistivity greater than $10^{11}$ ohm/square.

The term "aircraft" refers to manned or unmanned, piloted or unpiloted, and powered or unpowered machines capable of flight. This term includes, without limitation, airplanes, helicopters, unmanned air vehicles, missiles (controlled or uncontrolled), rockets (manned or unmanned), balloons, and any other objects capable of maintaining flight.

Figure 1:
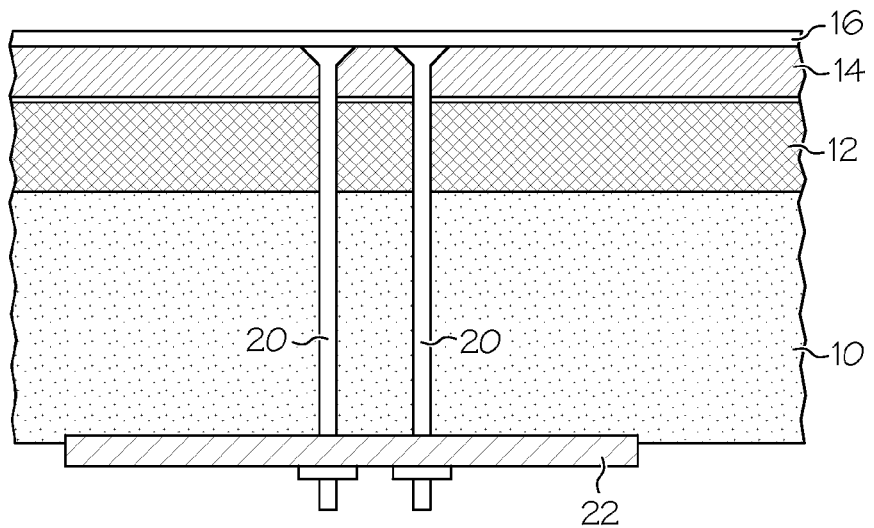
FIG. 1 is a cutaway view of a prior art structural assembly.

Expanded metal foil is used to coat the external skin of an aircraft in order to reduce electrical resistance. An example of this prior art is shown in FIG. 1. A basic composite substrate 10 of the aircraft may be covered with a dielectric layer 12 of an epoxy. An expanded aluminum foil 14 may be placed over and joined to the dielectric layer 12. A surfacer 16 may then be applied over the expanded aluminum foil 14 to create an aerodynamic surface. The dielectric resin in layer 12 needs to be compatible with the composite substrate resin but need not be the same resin. Epoxy may be chosen as the resin for the layer 12 because of its non-conductive properties, thereby avoiding galvanization between the aluminum and carbon surfaces by inhibiting electrical transfer between the surfaces. Glass may be chosen as the reinforcement for the resin layer 12 because of its non-conductive properties, thereby avoiding galvanization between the aluminum and carbon surfaces by inhibiting electrical transfer between the surfaces. Layer 12 may be chosen to be a glass epoxy, due to its lower cost and ease of use during manufacture. However, because of the dielectric layer 12 between the expanded aluminum foil 14 and composite substrate 10, the foil 14 is not in electrical communication with the composite substrate 10.

The substrate traditionally consists of an aluminum material that acts as a conductor to transfer electrical charge. However, light-weight materials such as a reinforced substrate or plastic that are static dissipative may be used to construct the substrate. The substrate or plastic may be reinforced by the use of a variety of reinforcing materials. For example, aramid, glass, or carbon fibers may be used to add strength and/or other properties to the substrate or plastic. These other properties may be mechanical, chemical, electrical, or other beneficial properties. The substrate may be selected to be static dissipative, however, those skilled in the art will recognize that a glass-reinforced plastic may function as a dielectric.

One option for grounding the foil 14 to the substrate 10 has been the use of fasteners 20 in electrical communication with the foil 14 and either a ground plate 20 or the composite substrate 10. The ground plate may be any electrically conductive component such as metallic substructure or ground straps. The joining technique may include dimpled washers, flat head screws, pan head fasteners, and the like, and be constructed of an electrically conductive material. The combination of the expanded aluminum foil 14 and fasteners 20 with a ground plate 20 serves to transfer electrical energy from the foil 14 to or through the composite substrate 10 and body of the aircraft. However, the use of fasteners may add additional weight, manufacturing time, and may require modification of the underlying aircraft structure. All of these factors increase the cost of such a system, in materials, labor, and operating costs.

Figure 2:
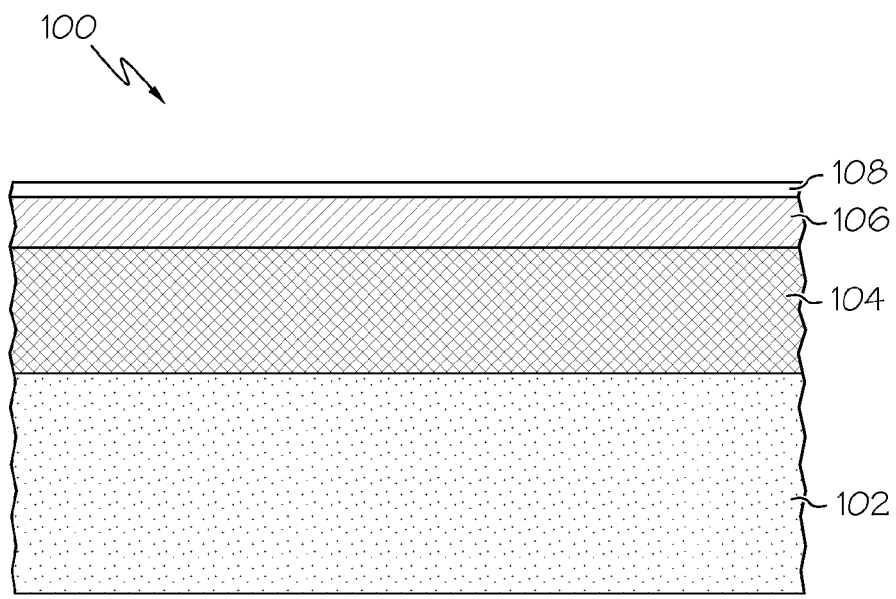
FIG. 2 is a cutaway view of one embodiment of the present invention.

FIG. 2 illustrates one aspect of the aircraft structural assembly of the present disclosure. As shown in this figure, the aircraft structural assembly, generally designated 100, may include a composite substrate 102 with an interface layer 104 layered onto the substrate 102. This interface layer 104 may contain an adhesive for joining the interface layer 104 to the basic composite substrate 102. A conductive layer 106 of expanded foil may be attached to the outer surface of the conductive interface layer 104. This conductive layer 106 may include an adhesive backing for securing the layer 106 to the conductive interface layer 104, or an adhesive may be applied between the interface layer 104 and conductive layer 106 for securing the components together. For some resin systems, no adhesive is required for layer 104, i.e. co-curing composite substrate layer 102 to interface layer 104 and interface layer 104 to conductive layer 106 provides sufficient adhesion. Finally, a surfacer 108 may be applied over the conductive layer 106. The surfacer 108 may be an epoxy which adheres to the expanded foil layer 106 and fills the holes in the expanded foil layer 106. The surfacer 108 may also permeate into or through the conductive interface layer 104 and bond with the basic composite substrate 102 and conductive interface layer 104. The surfacer may consist of resin and may also include a scrim reinforcement that uses continuous fibers such as a glass fabric or discontinuous such as a polyester mat.

The interface layer 104 may include a material, such as boron, which is highly galvanically compatible with both the basic composite substrate and the expanded aluminum foil. Additionally, the interface layer 104 may be electrically conductive, so that a charge delivered to the expanded foil 106 may pass through the conductive interface layer 104 to the composite substrate 102. By choosing a material for the interface layer 104 that is highly galvanically compatible with both the substrate 102 and foil 106, corrosion of the expanded aluminum foil 106 is minimized.

Alternatively, the interface layer 104 may include carbon nanotubes or composite nanostructure such as a glass fiber with carbon nanotube branches that is galvanically compatible with both the carbon substrate 102 and expanded foil 106. Further, this interface layer 104 may be electrically conductive, transmitting electricity from the expanded foil 106 to the carbon substrate 102. This same material may also serve as a surfacer 108.

The use of an interface layer 104 that exhibits at least static dissipative levels of electrical conductivity and is galvanically compatible with both expanded aluminum foil and the basic composite substrate 102 provides a high level of electrical conductivity relative to the prior art that uses a dielectric material. This high conductivity allows more current sharing during lightning strikes, thereby decreasing the chance of damage to the composite substrate 102 due to such a strike. The increased conductivity also allows precipitation static to be dissipated from the skin of the aircraft, reducing instrument noise.

The interface layer 104 may consist of a boron fiber with resin. This may generally consist of a plurality of boron fibers in a resin product to provide an adhesive between the basic composite substrate 102 and expanded aluminum foil 106. According to one embodiment, the boron fibers consist of a thin tungsten wire having a thermochemically-applied outer layer of elemental boron about the wire. This thermochemical treatment results in an enrichment of the tungsten core by a process known as boriding. The resulting fibers (having a diameter of approximately 4.0 or 5.6 mil (102 or 142 microns)) are essentially amorphous boron with a fully borided tungsten core. The resin may be selected to be the same, or compatible, with the substrate 102.

According to other variations of the present invention, the boron fiber may be provided in pre-impregnated (prepreg) composite fibers, such as a tape or fabric. The weaving of the boron fibers may be unidirectional and crosswoven with a polyester fiber yarn. The weave pattern, specific form, diameter, filler, resin type, resin quantity, and other essential elements of the boron fiber may be selected according to the specific demands to which the fiber may be used. By way of example only, a prepreg boron fiber tape may be preferred to provide for ease of assembly, or a non-impregnated fabric may be provided with a separate epoxy or resin to improve contact between the interface layer and substrate.

Figure 3:
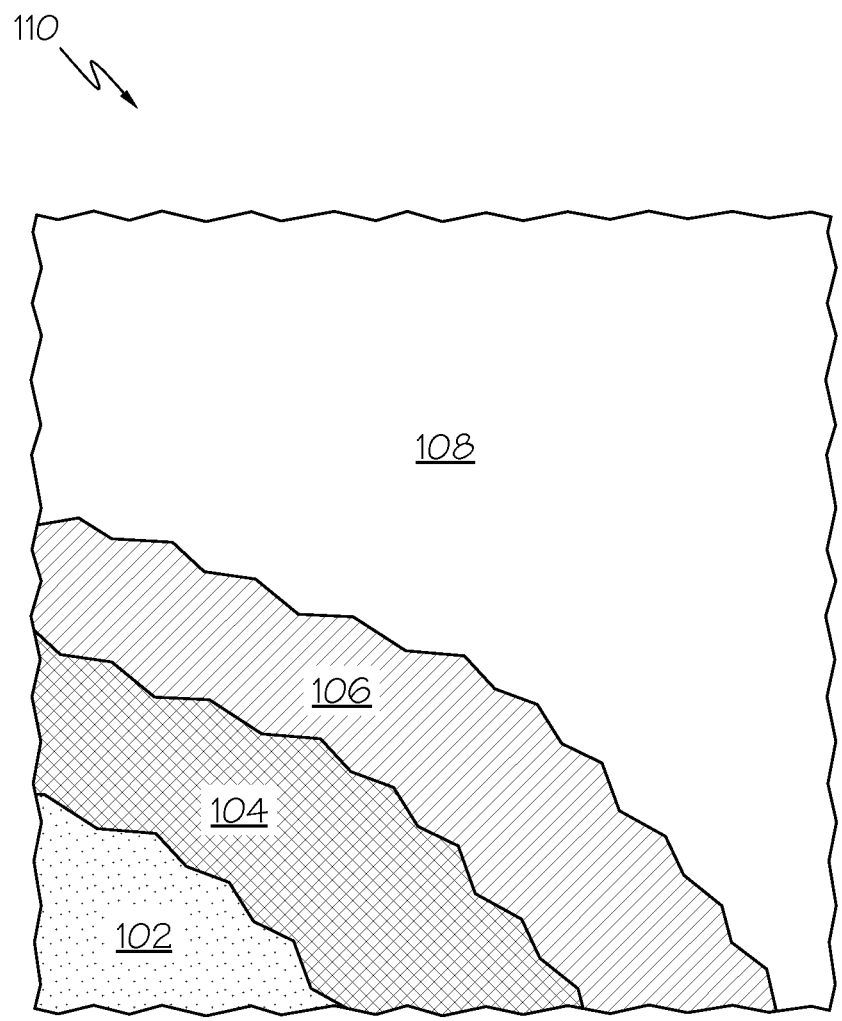
FIG. 3 is a top plan view of a portion of an aircraft structure embodying the present invention.

FIG. 3 shows a top view of a portion of an aircraft structure, generally designated 110, including the aircraft structural assembly 100. As shown, the portion 110 may consist of a composite substrate 102, conductive boron fiber interface layer 104, conductive layer 106, and surfacer 108. This portion 110 may be positioned on an aircraft 112 (see FIGS. 4A-B) in various positions to increase electrical conductivity of those specific portions of the aircraft 112.

Figure 4A:
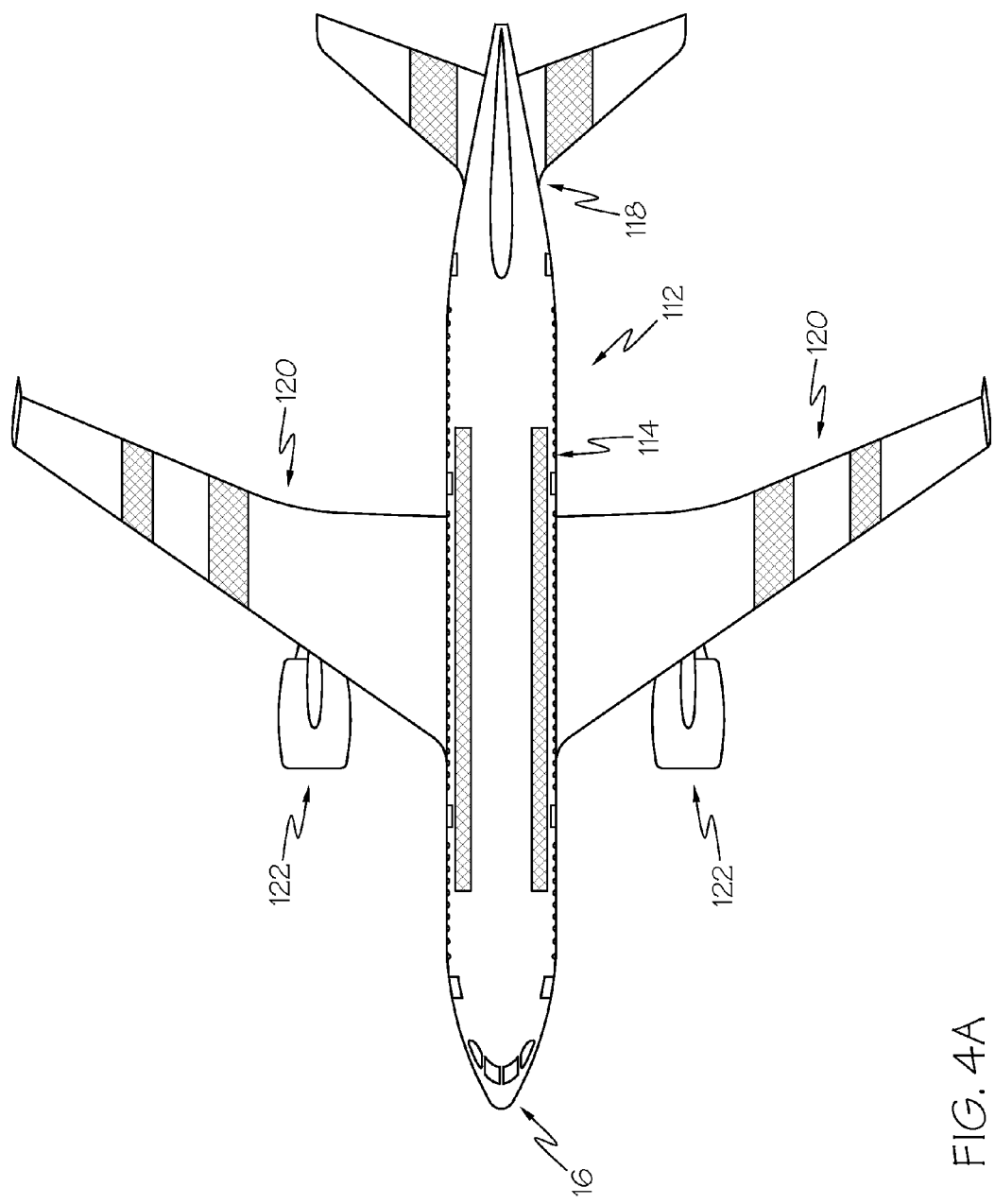
FIG. 4A is a top plan view of an aircraft.
Figure 4B:
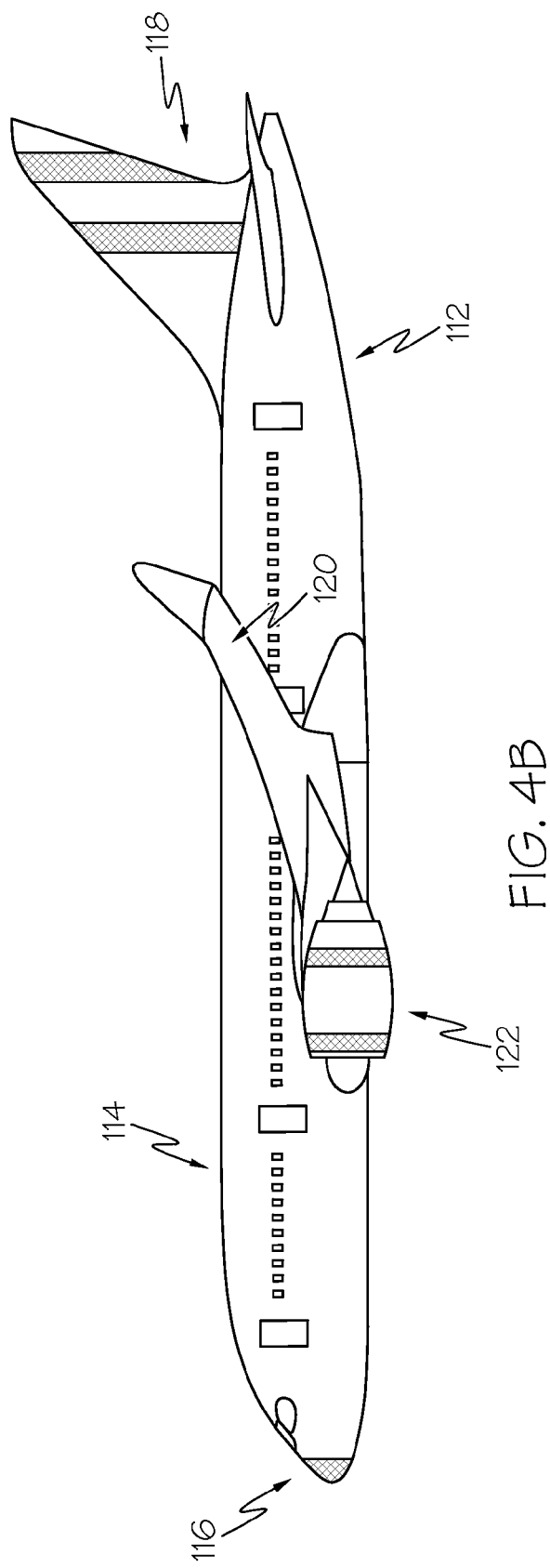
FIG. 4B is a side plan view of the aircraft of FIG. 4A.
Figure 7C:
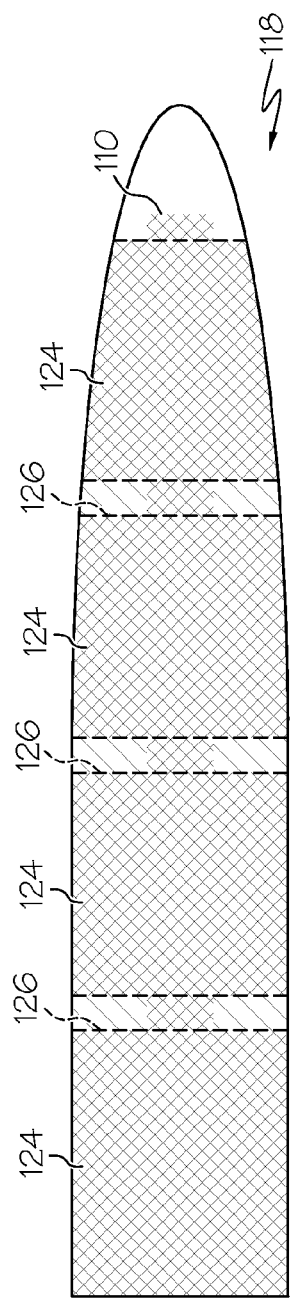
FIG. 7C is an aircraft wing illustrating an alternative embodiment.
Figure 7D:
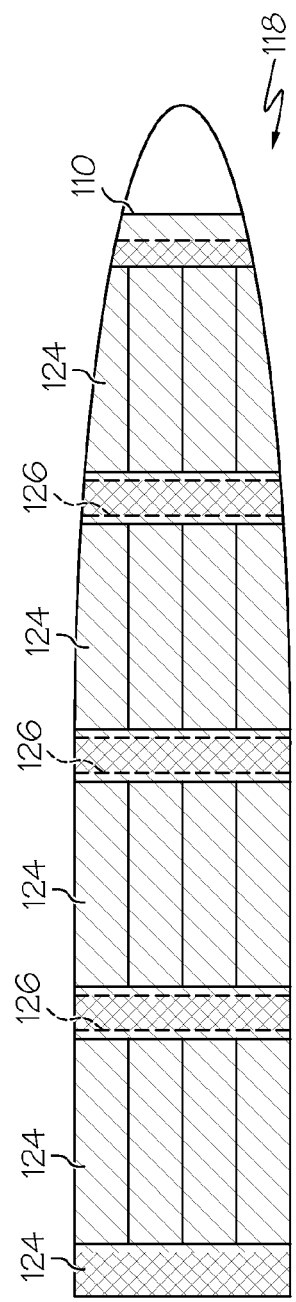
FIG. 7D is an aircraft wing illustrating an alternative embodiment.

FIGS. 4A-B show various portions 110 on an aircraft 112 which may include the improved structural assembly 100 (see FIG. 2). As shown in these figures, these portions need not cover the entire aircraft 112, only those areas which are particularly vulnerable to lightning strikes. These areas may include the fuselage 114, nose 116, tail 118, wings 120, or engine nacelles 122. Alternatively, the fairing between the fuselage 114 and wings 120 may be covered.

Specific arrangements showing the arrangement of portions 110 are shown in FIGS. 5A-7D. These figures illustrate the arrangement of the portion 110 on the wings 120 of the aircraft, however particular arrangements may be applied to other portions of the aircraft 112. In FIGS. 5A-7D, the airplane wing 118 is selectively covered in sheets 124 of expanded aluminum foil 106 (see FIG. 2). In some places, the wing 118 may include a portion 110 as described above. In places not identified as including these portions 110, a dielectric interface layer 12 (see FIG. 1) may be positioned between the expanded aluminum foil 106 and composite substrate 102 to prevent galvanization between the expanded aluminum foil 106 and basic composite substrate 102 (see FIG. 2).

Generally patches of the portion 110 are positioned at splices or overlapping sections 126 of the sheets 124 of expanded aluminum foil 106. The patches of the portion 110 may also be positioned at the termination points of the sheets 124 of expanded aluminum foil 106. These positions are locations where a higher concentration of current is desired to quickly dissipate built up electrical energy due to, for example, lightning strikes and/or where precipitation static build up needs to be mitigated. Alternatively, a conductive interface layer 104 may be placed between overlapping sections 126 of the sheets 124 to increase electrical conductivity between the sheets 124. This may be necessary, for example at a fairing, where the substrate 102 functions as a dielectric rather than a static dissipative. In this case, a dielectric interface layer 12 (FIG. 1) may be positioned between the lowermost sheet 124 and the substrate 102.

FIGS. 5A-C show one embodiment of the arrangement of the portions 110. In this embodiment, elongate sheets 124 of expanded aluminum foil 106 are positioned on the wing 120 and form overlapping sections 126. According to one embodiment, illustrated in FIG. 5A, the portion 110 may be positioned in small patches beneath the overlapping sections. According to a further embodiment, illustrated in FIG. 5B, the portion 110 may extend substantially along the entirety of the overlapping sections 126 in elongate rows. According to yet another embodiment, illustrated in FIG. 5C, the portion 110 may be positioned beneath the entire covered surface of the wing 120. The patches provide p-static mitigation at seams and splices and also reduce lighting damage.

FIGS. 6A-C show an alternative arrangement of the portions 110 and sheets 124. In these figures, the sheets 124 are shown as narrow strips crossing the length and width of the wing 120, with overlapping sections 126. According to one embodiment, illustrated in FIG. 6A, the portions 110 may be positioned at the overlap 126 of the sheets 124 and near the edges of the wing 120. According to a further embodiment, illustrated in FIG. 6B, the portion 110 may cover the entire area covered by the elongate sheets 124. According to yet another embodiment, illustrated in FIG. 6C, the portion 110 may be positioned selectively in strips beneath the sheets 124.

FIGS. 7A-D show another alternative arrangement of the portions 110 and sheets 124. In these figures, the sheets 124 are laid across the width of the wing 118, creating a plurality of sections of overlap 126. According to one embodiment, illustrated in FIG. 7A, the portions 110 may be positioned in patches at the overlap 126 of the sheets 124. According to an alternative embodiment, illustrated in FIG. 7B, the portion 110 may be a long strip running along the length of the wing

118. According to yet another embodiment, illustrated in FIG. 7C, the portion 110 may be positioned completely beneath the sheets 124. According to another embodiment, illustrated in FIG. 7D, the portion 110 may be positioned along the length of the overlap 126 between the sheets 124.

The various embodiments described above are intended to be illustrative in nature and are not intended to limit the scope of the invention. Any limitations to the invention will appear in the claims as allowed.

What is claimed is:

1. A method for constructing an aircraft structural assembly, the method comprising:
   providing a composite substrate having a low electrical conductivity;
   layering an interface layer directly onto said substrate, said interface layer consisting of a boron fiber with resin; and
   attaching a conductive layer directly to an outer surface of said interface layer, said conductive layer having a higher electrical conductivity than said composite substrate;
   wherein said interface layer is highly galvanically compatible with said conductive layer and is highly galvanically compatible with said composite substrate.

2. The method of claim 1, further comprising applying a surfacer over said conductive layer.

3. The method of claim 1, wherein said interface layer consists of boron fibers and a resin selected from a thermoplastic resin and a thermoset resin.

4. The method of claim 1, wherein said conductive layer comprises expanded aluminum foil.

5. A structural assembly for applying to a portion of an aircraft structure, the structural assembly comprising:
   a nonmetallic, composite substrate having a relatively low electrical conductivity;
   an outer layer having an electrical conductivity higher than the electrical conductivity of the nonmetallic substrate, said outer layer being galvanically incompatible with said nonmetallic substrate; and
   an interface layer consisting of a boron fiber with resin layered directly onto said nonmetallic, composite substrate, and said outer layer being attached directly to an outer surface of said interface layer, said interface layer having a higher electrical conductivity than said nonmetallic substrate and being highly galvanically compatible with said nonmetallic substrate and highly galvanically compatible with said outer layer.

6. The structural assembly of claim 5, wherein the nonmetallic substrate comprises a carbon-reinforced plastic.

7. The structural assembly of claim 5, wherein the outer layer is a nonferrous metal.

8. The structural assembly of claim 7, wherein the outer layer comprises an expanded foil.

9. The structural assembly of claim 8, wherein the nonferrous metal is aluminum.

10. The structural assembly of claim 5, wherein the resin comprises a thermoset resin or a thermoplastic resin.

11. The structural assembly of claim 10, wherein the boron fibers comprise pre-impregnated composite fibers.

12. The structural assembly of claim 11, wherein the boron fibers include a fully borided- tungsten core.

13. The structural assembly of claim 5, further comprising a surfacer permeating said outer layer.

14. The structural assembly of claim 5, wherein said nonmetallic substrate comprises a carbon reinforced plastic, said interface layer comprises a pre-impregnated tape including a thermoset resin and a unidirectional boron fiber, said outer layer comprises an expanded aluminum foil and said pre-impregnated tape is galvanically compatible with said nonmetallic substrate and said outer layer.

15. The structural assembly of claim 14, wherein said aircraft structure is selected from the group consisting of:
   a wing;
   a tail structure;
   a nose portion;
   a fairing;
   an engine nacelle; and
   a fuselage section.

16. A method of increasing the electrical conductivity of an aircraft having a substrate with low electrical conductivity, the method comprising:
   applying a resin tape consisting of pre-impregnated boron fibers directly to a portion of said substrate;
   applying an expanded aluminum foil directly to said tape and over said substrate, said expanded aluminum foil having a higher electrical conductivity than said substrate, whereby said resin tape is highly galvanically compatible with said substrate and highly galvanically compatible with said expanded aluminum foil; and
   applying a filler to said expanded aluminum foil to create an aerodynamic surface.

17. The method of claim 16, wherein the portion of said substrate is selected from the group consisting of:
   a wing;
   a tail structure;
   a nose portion;
   a fairing;
   an engine nacelle; and
   a fuselage section.

18. The method of claim 17, wherein said expanded aluminum foil is applied to said portion of said substrate in overlapping sheets.

19. The method of claim 18, wherein said resin tape is applied to locations where said sheets overlap.

20. The method of claim 18, wherein said resin tape is applied to the terminal regions of said sheets.

* * * * *